Figure 13:
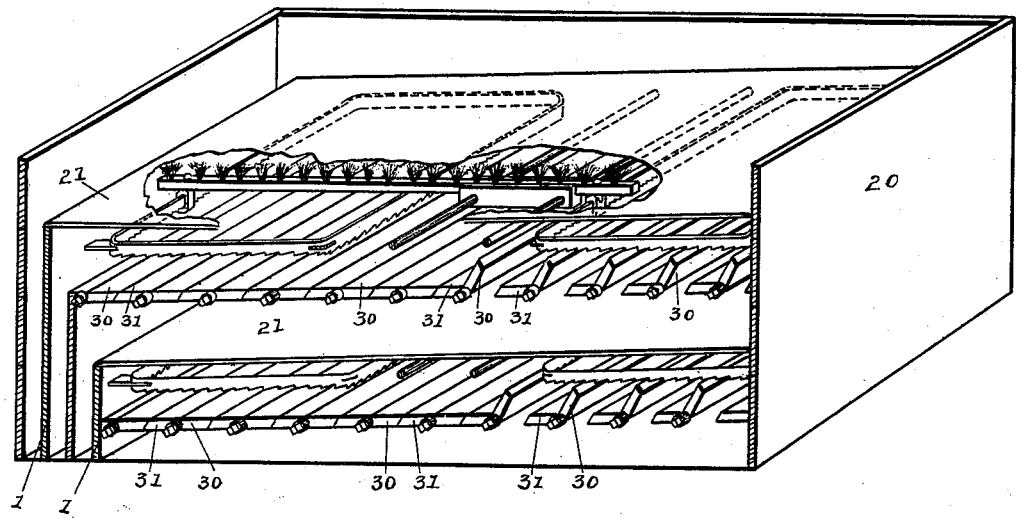

(No Model.) 3 Sheets—Sheet 1.
F. G. GAUNTT.
MEANS FOR KEEPING MESHES OF BOLTING CLOTH CLEAN.
No. 594,001. Patented Nov. 23, 1897.
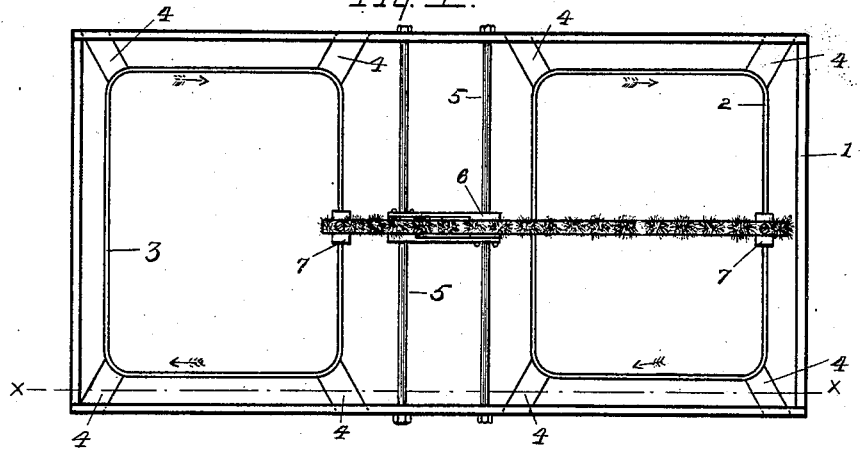
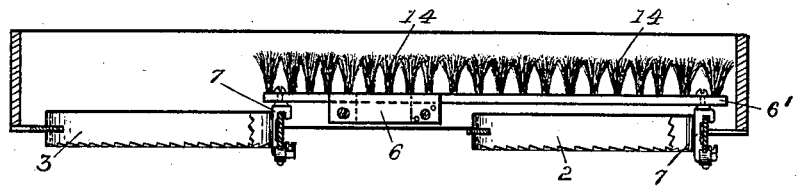
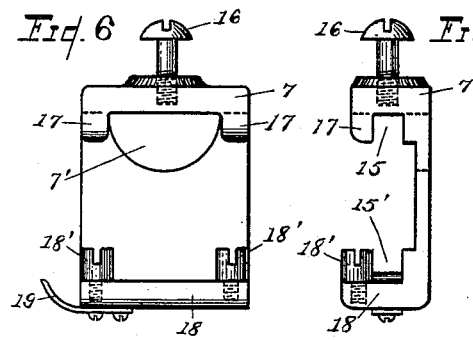
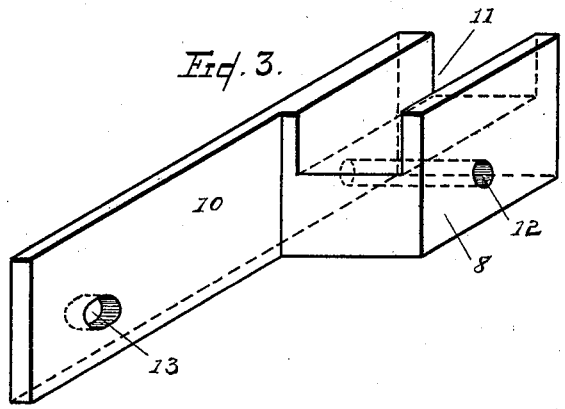
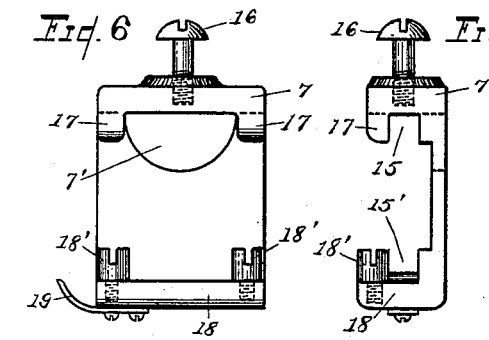
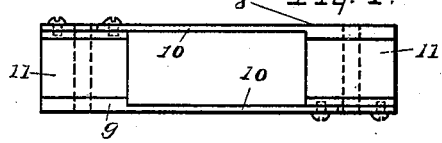
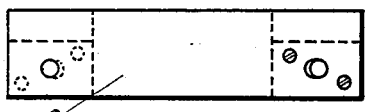
WITNESSES:
N. Webster Schlater
Minnie E. Schlater
Forest G. Gauntt  INVENTOR
BY Chapin & Denny
his ATTORNEYS.

(No Model.) 3 Sheets—Sheet 2.
F. G. GAUNTT.
MEANS FOR KEEPING MESHES OF BOLTING CLOTH CLEAN.
No. 594,001. Patented Nov. 23, 1897.
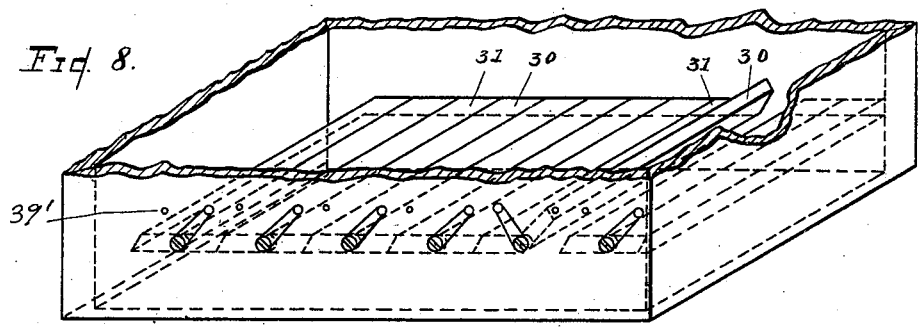
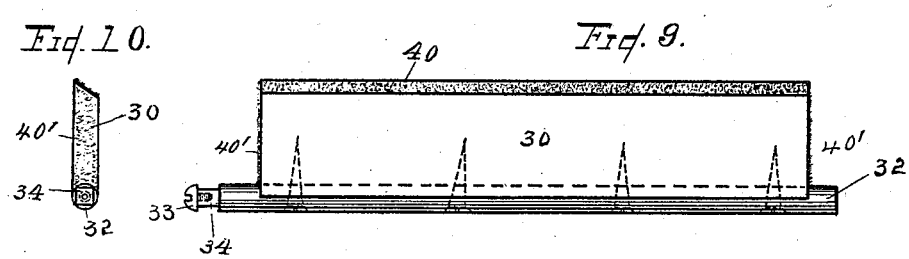
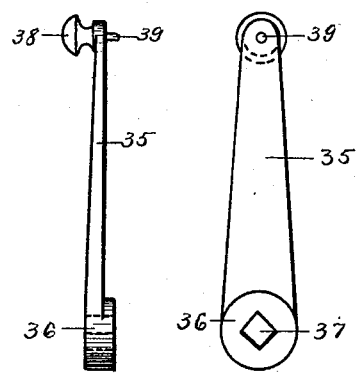
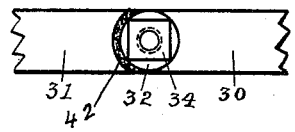
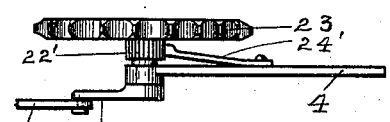
WITNESSES.    Forest G. Gauntt INVENTOR
N. Webster Schlater
Minnie E. Schlater.    BY Chapin & Denny
      his ATTORNEYS.

(No Model.) 3 Sheets—Sheet 3.

F. G. GAUNTT.
MEANS FOR KEEPING MESHES OF BOLTING CLOTH CLEAN.

No. 594,001. Patented Nov. 23, 1897.

WITNESSES: Forest G. Gauntt INVENTOR
N Webster Schlater
Minnie E. Schlater
BY Chapin & Denny
his ATTORNEYS.

UNITED STATES PATENT OFFICE.

FOREST G. GAUNTT, OF FORT WAYNE, INDIANA.

MEANS FOR KEEPING MESHES OF BOLTING-CLOTH CLEAN.

SPECIFICATION forming part of Letters Patent No. 594,001, dated November 23, 1897.

Application filed November 16, 1896. Serial No. 612,313. (No model.)

*To all whom it may concern:*

Be it known that I, FOREST G. GAUNTT, a citizen of the United States, residing at Fort Wayne, in the county of Allen, in the State of Indiana, have invented certain new and useful Improvements in Means for Keeping the Meshes of Bolting-Cloth Clean; and I do hereby declare that the following is a full, clear, and exact description of the invention, which will enable others skilled in the art to which it appertains to make and use the same, reference being had to the accompanying drawings, which form part of this specification.

My invention relates to improved means for keeping the meshes of bolting-cloth free.

It is well known that no positive, satisfactory, and reliable means for cleaning the sieves in a gyratory sifter has heretofore been provided, and that the common use of bouncing rubber balls to jar the meshes of the bolting-cloth open and the use of locust-seed to keep the meshes of the cloth free by wiping the cloth are a mere makeshift in the absence of a means for subjecting the meshes of the cloth to a uniform and positive cleaning treatment. It is also well known that no cut-off has heretofore been provided for a gyrating sifter.

The object, therefore, of my invention is to provide a simple, cheap, and efficient means for cleaning the bolting-cloth of gyratory sifters, light and durable in construction, taking up but little space, requiring neither lubricating-oil nor attention when in use, adapted for operating upon either the upper or lower surface of the sieve, adapted to be actuated by the motion of the gyratory sifter in which it is mounted, and to operate in unison therewith, so arranged as to subject the meshes of the cloth to a uniform positive cleaning treatment, and thereby permitting the working of the sieve to its full capacity.

Another object of my invention is to provide an improved cut-off for gyratory sifters which can be conveniently adjusted and operated when the machine is in full operation.

My improved cleaning attachment compries a pair of hanger-tracks rigidly fixed in the sieve-frame and having ratchet-teeth upon one edge thereof, transverse guide-rods also fixed in said frame, a pair of hanger-brackets slidably mounted on said tracks, and a traveling brush fixed upon said brackets and slidably mounted on said guide-rods by a two-part guide-bracket, whereby the said brush is continuously driven upon said tracks by the gyratory movements of the sieve on which it is mounted.

The principal novel feature of my invention is the means by which my improved cleaning attachment is actuated by the gyratory sieve on which it is mounted and adapted to be operated in unison therewith.

Similar reference-numerals indicate similar parts throughout the several views of the drawings, in which—

Figure 14:
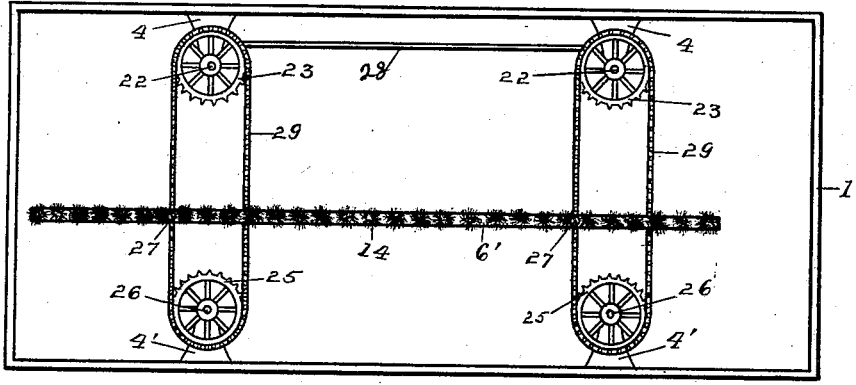

Figure 1 is a plan of my improvement mounted upon its supporting-frame. Fig. 2 is a longitudinal section of Fig. 1 on the line $x\ x$ with the track broken away at one side to show the traveling hangers in position thereon. Fig. 3 is a perspective view of one of the pair of blocks forming the two-part guide-bracket. Fig. 4 is a plan of said two-part guide-bracket. Fig. 5 is a side view of the same. Fig. 6 is a detail of the traveling brush-hanger. Fig. 7 is an end view of the same, showing the vertical recess therein for the hanger-track. Fig. 8 is a perspective view of the sifter-box, broken away in part to show the cut-off in position therein. Fig. 9 is a detail of the cut-off valve, and Fig. 10 is an end view of the same. Figs. 11 and 12 are detail views of the spring-handle for the said valves. Fig. 13 is a perspective view of my improvement in position in the sifter-box, also showing the cut-off valves. Fig. 14 is a modified form of my improvement, showing a different means for driving the same. Fig. 15 is an enlarged fragmentary end view of the valve and its supporting-strip, showing the wool-joint. Fig. 16 is a plan of one of the sprocket-wheels 23, showing the crank, with which a regulating-pitman is connected, and also showing the means for preventing the rotation of said wheels in but one direction.

Referring now to Fig. 1, the rectangular sieve-frame 1 is of the usual or any proper construction. In or to this sieve-frame is rigidly fixed in parallel arrangement a pair of endless metallic tracks 2 and 3 identical in form and construction, each track being preferably in the form of a parallelogram with its corners rounded to permit a continuous travel of the slidable hangers. The said tracks are fixed in said frame by means of the lateral brackets 4, the inner end of which is fixed in said tracks midway the upper and lower edges thereof, so as not to interfere with the free movement of the sliding brackets thereon. The lower edge of said tracks are provided throughout their length with a uniform and equal number of notches, as shown in Figs. 2 and 13, for the purpose hereinafter described. Between the said tracks 2 and 3 and at a proper distance apart the parallel transverse rods 5 are rigidly secured in the opposite sides of the frame 1. On these rods the guide-bracket 6 is slidably mounted.

The metallic hangers 7, Figs. 6 and 7, have their top portion provided with the pendent lugs 17, forming the alined recesses 15, adapted to loosely receive the upper edge of said track. The upper portion may also have a lateral opening 7' merely for the purpose of reducing the weight thereof. The lower end of said hanger has a lateral flange 18, near the outer edge of which are secured the screws 18', in vertical alinement with the corresponding lugs 17, the said screws having a cylindrical head and forming a recess 15' for the lower edge of the said track. To the lower face of said flange 18 is rigidly fixed by proper holding-screws the spring-ratchet 19, whose free end is adapted to engage the said notches on the lower edge of said tracks, for the purpose hereinafter described.

The two-part guide-bracket 6 is formed of the metallic blocks 8 and 9, which are in all respects identical in construction, have a longitudinal recess 11, Fig. 3, adapted to loosely receive the back or handle 6' of the cleaning-brush, and also have a longitudinal extension 10, having near its free end the lateral perforation 13 to loosely receive one of the guide-rods 5. The other end of said blocks also has a lateral perforation 12 to loosely receive the other guide-rod 5. The blocks 8 and 9 are secured together in such a manner by proper holding-screws that the aperture 12 of the one will coincide with the aperture 13 of the other, and the recess 11 of the one will be in horizontal alinement with the recess 11 of the other, as seen in Fig. 4. The traveling cleaning-brush formed of properly-arranged tufts 14, of any suitable material, has its back 6' slidably mounted in the slots or recesses 11 of the said guide-bracket, and has its ends pivotally secured on the top of the said hangers 7 by means of the holding-screws 16. The perforations 13 are slightly elongated to admit of a limited longitudinal adjustment in case the said guide-rods should not be quite parallel throughout their length. As the hangers 7 are slidably mounted on the said tracks 2 and 3 and the guide-bracket 6 is slidable on the guide-rod 5, it is obvious that the cleaning-brush is adapted for a continuous movement on said tracks, thereby bringing said brush into contact with the entire adjacent surface of the bolting-cloth. The teeth on the lower edge of the said tracks point in opposite directions on opposite sides thereof, whereby the said hangers slide freely on said tracks in the directions indicated by the arrows in Fig. 1, but are prevented from moving in the opposite direction by the engagement of the said ratchet-pawl 19 with the said teeth thereon.

My improvement thus constructed can be made of any desired size and arranged one above another in a series of sieve-frames properly fixed in a containing sifter-box 20, (shown in Fig. 13,) in which the brush frees the meshes of the bolting-cloth 21 by contact with its lower surface, the preferable arrangement.

A modified form of my invention is shown in Fig. 14, in which the cleaner-brush is given a similar rotary movement by means of sprocket-wheels and carrying-chains instead of the hanger-brackets, as follows: The brackets 4 and 4' are fixed in the sides and near the ends of the sieve-frame 1 and carry upon their inner end the short shafts 22 and 26, respectively, for the respective sprocket-wheels 23 and 25. The shafts 22, identical in construction, have the corresponding sprocket-wheel 23 fixed upon one end thereof and have upon their other ends rigid cranks 24 which are connected by the pivoted pitman 28, Figs. 14 and 16, adapted to secure uniformity of rotation of the said wheels 23 for the purpose of keeping the brush in perfect alinement with the sides of the sieve under all conditions of service. The said shafts 22 are rotatably mounted in the bracket 4, but the shafts 26 are fixed in the brackets 4' and the said wheels 25 are rotatably mounted thereon. The said brackets 4' have the opening for the shafts 26 elongated to admit of lateral adjustment of the wheels 25 for the purpose of tightening the sprocket-chains 29 in a well-understood manner. The endless sprocket-chains 29 are so mounted on said wheels as to connect the wheels 23 and 25, being arranged transversely to the sieve-frame, as shown. To these chains the brush is secured by the pivoted screws 27, which are arranged approximately equidistant from the respective ends thereof, whereby the brush in its rotary movement swings laterally in the said guide-bracket a distance equal to the diameter of the sprocket-wheels, and thus comes in direct contact with every portion of the adjacent surface of the sieve or bolting-cloth. The said brush may be prevented from rotating in but one direction by a suitable pawl or detent 24' pivotally mounted on one of said brackets 4, Fig. 16, adapted to engage an integral annular ratchet-lug 22' on the shaft 22, but adapted to drag idly over said lug when the wheels are rotated in the desired or predetermined direction.

My improved cut-off for enabling the operator to cut off any desired quantity of flour in a gyratory-sieve machine is constructed as follows: Immediately below my improved cleaning attachment above described and in the same sieve-frame are rigidly fixed in the sides of box 20 a series of transverse strips or plates 31 and an alternate arrangement of hinged valves 30, rigidly secured by proper holding screws or other proper manner to the metallic rods 32, which have their ends rotatably mounted in the opposite sides of the box 20 in proper perforations therein. One end of said rods has a reduced angular shoulder 34, provided with a screw-threaded perforation in the end thereof for the screw 33. The spring-metal handle 35 has upon one end a circular head 36, provided with a central rectangular perforation 37, adapted to receive the shoulder 34 of the rod 32. The said handle 35 is then secured in position by the said screw 33. The other end of the said handle 35 has upon the outer face a knob or operating-handle 38 and has upon its inner face a pin 39, adapted to register with a suitable perforation 39' in the adjacent side of box 20, Fig. 8, when it is desired to secure the corresponding hinged valve in an open position. The concave edge or face of the said fixed strips or parts 31, adjacent to the rotatable rod 32, is so padded with wool, in a well-understood manner, as to form a tight wool joint 40, Fig. 15. The ends and free edge of the hinge-valve 30 are also wool-padded, as at 40 and 41, Figs. 9 and 10. It is obvious that when the said valves are closed they form a tight bottom or floor and that they with their supporting-strips require no more space than an ordinary floor, which is of course necessary in all cases. The valves 30 and their supporting-strips 31 can of course be made of any proper material, preferably of wood.

The operation of my invention thus described is briefly stated as follows: As the hangers 7, on which the traveling brush is pivotally mounted, are slidably mounted on the endless tracks 2 and 3, on which they can move but in one predetermined direction or rotation because of the ratchet-teeth on said tracks and the ratchet-spring on said hangers, as described, and as the said brush is loosely mounted in the guide-bracket 6 it is obvious that the gyratory movements of the sifter-box 20, with its contained sieve-boxes, will impart to the said cleaning-brush a continuous rotary movement on said tracks, thereby bringing it into direct contact with every portion of the adjacent surface of the said bolting-cloth. It is also obvious that as the said brush is thus driven automatically by the gyrations of the sifter-box, the speed of rotation of the brush on said tracks will be proportional to and in unison with the speed of rotation of said box, so that the operation of the cleaning-brush will always be proportional to the work required of the bolting-cloth.

It is obvious that the manner of mounting my cleaner-brush in the sieve-frame may be indefinitely varied without departing from the spirit of my invention, which consists in providing a traveling brush for a gyratory sifter so arranged in the sieve-frame as to successively free the meshes of the bolting-cloth and adapted to be actuated by the gyratory movements of the sieve-frame in which it is mounted. For example, the said brush can be pivotally mounted on a pair of endless transverse carrying-chains mounted on sprocket-wheels, as shown in Fig. 14. As the wheels 23 are fixed on their respective shafts, which are connected by the pitman 28, there will be a uniformity of rotation of said wheels under all conditions of service, which will thereby maintain the brush in true alinement with the sides of the said sieve, and as the said wheels are prevented from rotating in but one direction by proper ratchet mechanism it is obvious that the brush will be driven continuously in one direction of travel by the vibratory movements of the sifter-box, and that its operation requires no attention from the operator. My improved brush can thus be operated with the contained sieve-boxes arranged at any desired angle.

The operation of my improved cut-off for gyratory sifters is readily understood. When the operator desires to open one of the hinged valves 3, he seizes the knob 38 of the spring arm or crank 35 and withdraws the pin 39 from its perforation, elevates the valve by a rotary movement of its hinges, and firmly secures it in such position by the engagement of the pin 39 with another suitably-arranged perforation in the side of the box 20. The operator can thus readily and conveniently open or close as many of said valves as desired when the machine is in operation. The position of the crank-handles 35 will at all times indicate to the operator which valves are open and which are closed. As shown, when a valve is open no material can pass the valve in either direction, that from the head of the machine passing through the valve-opening and that on the other side being shut off by the upright valve, thus forming a convenient and reliable means for separating the material at pleasure.

Having thus described my invention and the manner of operating the same, what I desire to secure by Letters Patent is—

1. The combination in a gyratory sieve of the sieve-frame 1; a pair of rectangular tracks rigidly suspended in said sieve-frame in parallel arrangement by proper supporting-brackets; a traveling cleaner-brush longitudinally arranged in said frame, slidably mounted upon said tracks and actuated in one continuous direction of travel in contact with the bolting-cloth, by the momentum of the sieve-frame; means for preventing a retrograde movement of the brush on said tracks; and means for maintaining said brush in parallel arrangement with the sides of said frame throughout its travel, all substantially as described.

2. The combination of the sieve-frame 1 having a bolting-cloth thereon; the horizontal rectangular tracks 2 and 3 rigidly suspended in said frame in parallel relation; a pair of transverse parallel guide-rods rigidly fixed in the sides of said frame intermediate the said tracks; a longitudinally - slotted guide - bracket slidably mounted on said guide-rods and adapted to maintain the cleaning-brush in parallel arrangement with the sides of said frame throughout its travel; a traveling cleaning-brush slidably mounted in said guide-bracket and on said supporting-tracks in contact with the sieve-cloth, and adapted to be actuated or driven in one continuous direction by the gyratory motion of the sieve-frame, and provided with means for preventing a retrograde movement thereof, all substantially as described.

3. The combination of the sieve-frame 1 having a bolting-cloth therein; a pair of rectangular tracks arranged in parallel relation and fixed in said frame as shown; the hangers 7 slidably mounted on said tracks and adapted for movement in but one direction thereon; a traveling cleaning-brush pivotally mounted on said hangers and adapted to be actuated or driven in one continuous direction on said tracks by the momentum or gyration of the said frame; and means for maintaining said brush in its normal position relative to the sides of the said frame throughout its travel, all substantially as described.

4. The combination of the sieve-frame 1 having a bolting-cloth 21 arranged therein; the tracks 2 and 3 suspended in said frame, as shown, and provided upon one edge thereof with a series of ratchet-teeth; the hangers 7 slidably mounted on said tracks and provided with the spring-detent 19 to engage said teeth under the conditions described; the parallel rods 5 arranged as shown in said frame; the two-part guide-bracket 6 slidably mounted on said rods and adapted to loosely contain the traveling brush for the purpose specified; and the traveling brush for freeing the meshes of the bolting - cloth slidably mounted in said guide-block and having its ends pivotally mounted on said hangers, and adapted to be actuated or driven continuously in one direction in its rectangular path on said tracks by the gyratory motion of the said containing-sieve frame, all substantially as described.

Signed by me, at Fort Wayne, Allen county, State of Indiana, this 10th day of November, A. D. 1896.

FOREST G. GAUNTT.

Witnesses:
MILLARD STANEKY,
MANASSEH G. GARARD.